United States Patent [19]
Iliev et al.

[11] Patent Number: 5,459,720
[45] Date of Patent: Oct. 17, 1995

[54] SYSTEM FOR INTERNETWORKING DATA TERMINAL EQUIPMENT THROUGH A SWITCHED DIGITAL NETWORK

[75] Inventors: Simeon Iliev; David J. Carson; Timothy Butler, all of Ann Arbor; Paul A. DeVries, Wayne, all of Mich.

[73] Assignee: Network Express Inc., Ann Arbor, Mich.

[21] Appl. No.: 220,951

[22] Filed: Mar. 31, 1994

Related U.S. Application Data

[63] Continuation of Ser. No. 813,127, Dec. 23, 1991, abandoned.

[51] Int. Cl.⁶ .......................... H04L 12/56; H04Q 11/04
[52] U.S. Cl. .................... 370/60; 370/94.1; 370/118
[58] Field of Search .............. 370/54, 55, 58.1, 370/58.2, 58.3, 60, 60.1, 66, 68, 68.1, 84, 94.1, 112, 118, 79, 82, 83, 99, 110.1

[56] References Cited

U.S. PATENT DOCUMENTS

| | | | |
|---|---|---|---|
| 4,074,232 | 2/1978 | Otomo et al. | 370/94.1 |
| 4,547,880 | 10/1985 | DeVita et al. | 370/61 |
| 4,577,312 | 3/1986 | Nash | 370/118 |
| 4,703,475 | 10/1987 | Dretzka et al. | 370/54 |
| 4,706,716 | 11/1987 | Bowers et al. | 370/58.1 |
| 4,805,167 | 2/1989 | Leslie et al. | 370/84 |
| 4,823,124 | 4/1989 | Beauchemin | 340/825.52 |
| 4,864,567 | 9/1989 | Giorgio | 370/118 |
| 4,870,641 | 9/1989 | Pattavina | 370/60 |
| 4,885,738 | 12/1989 | Bowers et al. | 370/58.1 |
| 4,888,765 | 12/1989 | Dyke | 370/95.1 |
| 4,899,334 | 2/1990 | Shimizu | 370/60 |
| 4,899,337 | 2/1990 | Hirai | 370/84 |
| 4,922,486 | 5/1990 | Lidinsky et al. | 370/60 |
| 4,967,405 | 10/1990 | Upp et al. | 370/58.1 |
| 4,977,556 | 12/1990 | Noguchi et al. | 370/60 |
| 4,985,887 | 1/1991 | Mizuhara et al. | 370/60 |
| 4,991,172 | 2/1991 | Cidon et al. | 370/94.1 |
| 5,005,170 | 4/1991 | Nelson | 370/84 |
| 5,008,878 | 4/1991 | Ahmadi et al. | 370/60 |
| 5,012,470 | 4/1991 | Shobu et al. | 370/94.1 |
| 5,014,262 | 5/1991 | Harshavardhana | 370/94.1 |
| 5,050,166 | 9/1991 | Cantoni et al. | 370/94.1 |
| 5,065,396 | 11/1991 | Castellano et al. | 370/118 |
| 5,065,398 | 11/1991 | Takashima | 370/94.1 |
| 5,068,877 | 11/1991 | Near et al. | 375/107 |
| 5,229,992 | 7/1993 | Jurkevich et al. | 370/60 |

*Primary Examiner*—Alpus Hsu
*Attorney, Agent, or Firm*—Dykema Gossett

[57] ABSTRACT

A System including device access, network access system management, and related method for providing users who have require aperiodic high bandwidth data transmission requirements between remote sites access over a public switched digital network of a conventional type is disclosed. The invention uses a scheme of inverse multiplexing by which it first logically splits a high bandwidth information stream into multiple narrow band signals for transmission through public switched digital network over a plurality of narrow band channels to be received at the remote location by another Switched Network Access System then recombined to form the original high bandwidth information stream causing the multiple narrow band channels to appear as a single high bandwidth channel to remote high bandwidth end users. The Switched Network Access System provides automatic bandwidth allocation and agility which optimizes throughput and reduces data communications costs by adding or dropping narrow band channels "as needed" based on user bandwidth utilization.

35 Claims, 9 Drawing Sheets

SYSTEM FOR INTERNETWORKING DATA TERMINAL EQUIPMENT THROUGH A SWITCHED DIGITAL NETWORK

This application is a File Wrapper Continuation of applicants' application Ser. No. 07/813,127 filed Dec. 23, 1991, now abandoned.

FIELD OF THE INVENTION

The present invention relates to a system for interconnecting pluralities of communication stations such as Personal Computer Local Area Networks (PC LANs) via access to Public Switched Digital Networks (PSDNs) provided by common carriers such as inter exchange carriers, local exchange carriers and foreign national telephone companies. More particularly the invention relates to a customer premise based Switched Network Access System and a related method for providing a virtual wideband network using a plurality of narrow band channels. The related method converts LAN and terminal destination addresses into telephone numbers then establishes multiple call connections to multiple remote destinations through both PSDNs and/or dedicated private line networks while performing dynamic bandwidth allocation and adjustment between end points based on predetermined channel utilization criteria.

BACKGROUND ART

During the 1980s, there was a great increase in the number and use of personal computers and workstations interconnected by LANs which allowed local users to share resources. However LAN growth has been unpredictable and provincial. Consequently the need to develop Wide Area Networks (WANs) to internetwork LANs, high performance terminals and work stations in an effort to organize, manage and provide rapid access to distributed information resources has grown in importance during the 1990s. WANs provide a bridge between the PC/LAN environment and the large host environment giving PC users access to remote high bandwidth applications such as imaging, CAD/CAM and data base management. A barrier to the development of WANs has been the inability of telecommunications facilities to meet high bandwidth availability and reliability requirements of new computer applications which manipulate ever increasing amounts of information.

Others in the past have attempted to combine several narrow band channels to form a wideband facility employing the public switched digital network. These arrangements typically establish each narrow band channel independently of one another resulting in multiple transmission paths routed through different network equipment. Thus each narrow channel may have a different length and propagation time or transmission delay. An arrangement embodying this approach is detailed in U.S. Pat. No. 4,577,312 issued on Mar. 18, 1986 to Nash. The system shown in this prior patent breaks a high bandwidth information stream into multiple streams then transmits information simultaneously over multiple narrow band channels reconstructing the original information stream at the receiving end. An associated phone set is used to establish each connection independently of preceding paths. Transmission delay on each connection is measured by sending and receiving a test pattern. A compensating delay is then inserted into each line so that information sent along each narrow band channel arrives at a constant delay across all channels. This arrangement proves troublesome because any central office in any of the multiple paths established may, at any time, generate a frame slip (extra bit) in an attempt to maintain line synchronization. When a frame slip is generated, all delays previously determined become invalid thereby degrading network performance. New delay parameters must be ascertained and the multiple channels re-synchronized. Resynchronization of the multiple channels is difficult because of the unpredictable manner in which the frame slips are generated in an extensive network. The present invention is directed toward eliminating the above deficiencies of prior art systems.

SUMMARY OF THE INVENTION

The present invention provides a system architecture and related method for interconnecting communication stations such as PC/LANs via access to both PSDNs and dedicated private line networks. The present invention performs inverse multiplexing by which it first splits a stream of high bandwidth data packets into multiple narrow band packet streams for transmission through a public switched digital network over a plurality of narrow band channels to be received at a remote location by another Switched Network Access System then recombined to form the original high bandwidth information stream. Inverse multiplexing causes multiple narrow band channels to appear as a single high bandwidth channel to high bandwidth end users. The System also provides automatic bandwidth allocation and agility which optimizes throughput and reduces data communications costs by adding or dropping narrow band channels "as needed" based on user bandwidth utilization criteria.

The Switched Network Access System is immediately applicable to communications between remote high bandwidth users via both public switched digital networks and dedicated private line networks or any combination of standard communication services provided by common carriers. The application of the present System within local area networks and other related applications is obvious.

Thus according to one aspect of the present invention, a method for transmitting high bandwidth data messages in the form of packets between user terminals via communication lines in a switched digital network comprising the steps of receiving packets of digital data, establishing a communication connection, identifying available time slots in the communication connections established, appending sequencing and routing information then transmitting each of the packets is described.

According to another aspect of the present invention, a method for transmitting high bandwidth messages between remote communication stations connected by a switched digital network comprising the steps of establishing a plurality of communication connections to a receiving station, forming each message into one or more packets of digital data, dividing each of said packets into a plurality of sub-packets, transmitting the sub-packets through the plurality of communication connections, receiving the sub-packets at the receiving and, reassembling the sub-packets into packets is disclosed.

According to another aspect of the present invention, an apparatus for transmitting high bandwidth data messages in the form of packets between user terminals via communication lines in a switched digital network comprising, a means for cross connecting data bits from any input time slot of a switching means for output onto any time slot of one or multiple channels, and a means for inverse multiplexing of data packets is disclosed.

It is therefore an object of the present invention to provide access to PSDNs to achieve global WAN interconnectivity thereby allowing PC and terminal users to share computing resources and gain access to information and applications which reside on modern remote hosts and servers.

Another object of the present invention is to reduce communication costs between LANs, terminals and workstations by providing bandwidth agility through dynamic bandwidth allocation on an "as needed" basis for each call session.

A further object of the present invention is to simplify internetworking between LANs, terminals and workstations by providing concurrent WAN connections and inverse multiplexing across a plurality of network services and network carriers.

A further object of the present invention is to meet high bandwidth communication facility requirements demanded by new asynchronous applications such as T1 backup and peak overflow management.

Other objects, features and advantages will become clear or wall be made apparent during the course of the following descriptions of a preferred embodiment of the present invention.

DETAILED DESCRIPTION OF THE PREFERRED EMBODIMENTS

Figure 1:
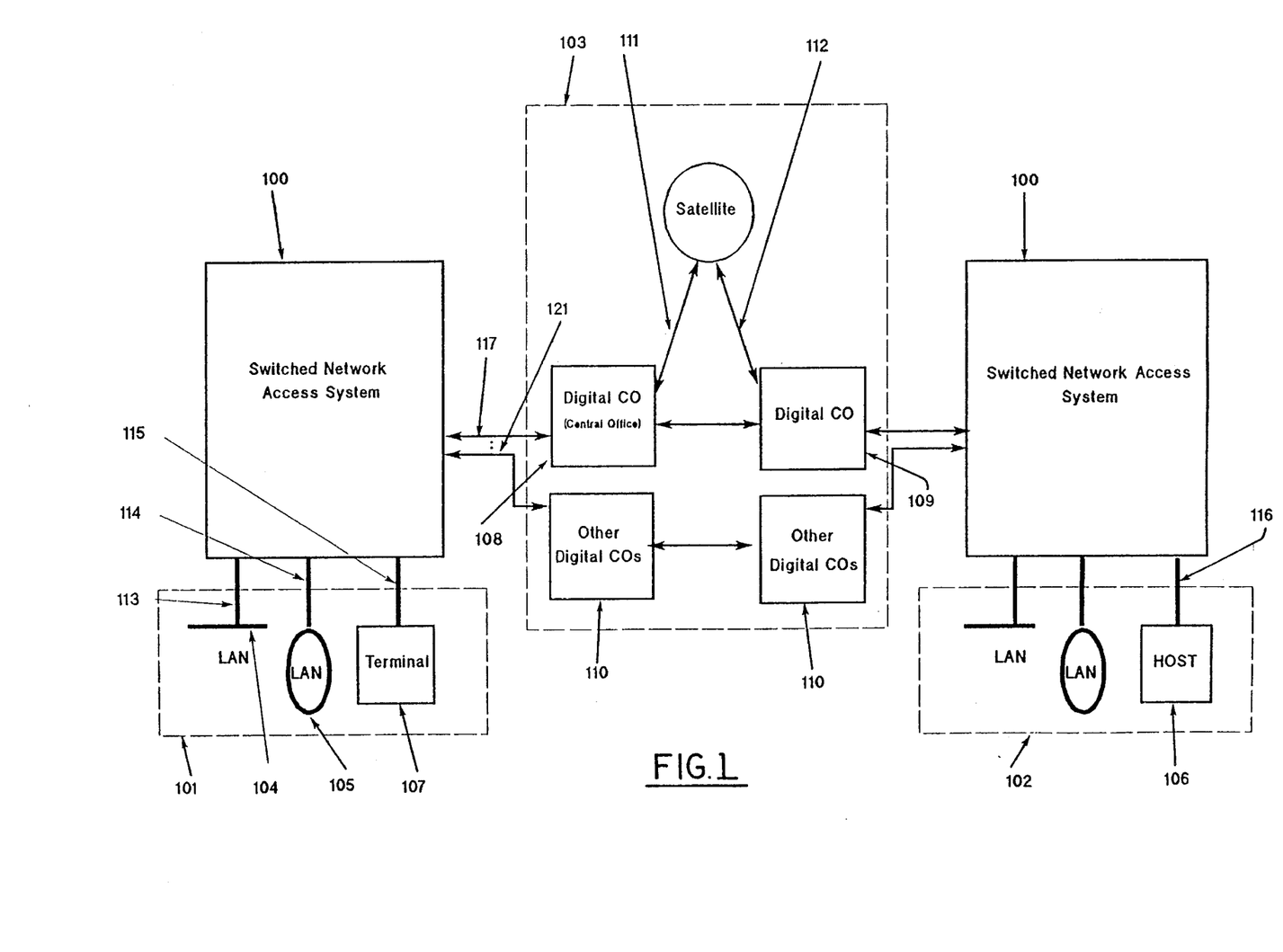
FIG. 1 is a broad block diagram depicting a pair of Switched Network Access Systems of the present invention interconnecting remote high bandwidth application users via a public switched digital network.

Referring now to the drawings wherein like reference numerals are used to reference identical components in various views, FIG. 1 depicts a pair of Switched Network Access Systems 100 providing access for communication stations in the form of high bandwidth users 101-102 to public switched digital network 103. High bandwidth users 101-102, include by way of example Ethernet type LAN 104, token ring type LAN 105, host computer 106, and data terminal 107 and run computer applications such as imaging, CAD/CAM, file transfer, and database management which require aperiodic high bandwidth data transmission between remote sites. Public switched digital network 103 is of a conventional type comprising, by way of example, local central office 108, remote central office 109, other central offices 110 and satellite links 111-112. Device access links 113-116 including LAN access links 113-114 connect high bandwidth user 101 or 102 to Switched Network Access System 100. Network access links 117-121 including switched network access link 117 connect Switched Network Access System 100 to public switched digital network 103.

Each Switched Network Access System 100, uses a scheme of inverse multiplexing by which a high bandwidth information stream is first split into multiple narrow band channels, transmitted through public switched digital network 103 over a plurality of narrow band channels to be received at the remote location by another Switched Network Access System 100 then recombined to form the original high bandwidth information stream. Switched Network Access System 100 causes multiple narrow band channels to appear as a single high bandwidth channel to remote high bandwidth end users 101 and 102 and provides automatic bandwidth agility and allocation which optimizes throughput and reduces data communications costs by adding or dropping narrow band channels "as needed" based on user bandwidth utilization.

Figure 2:
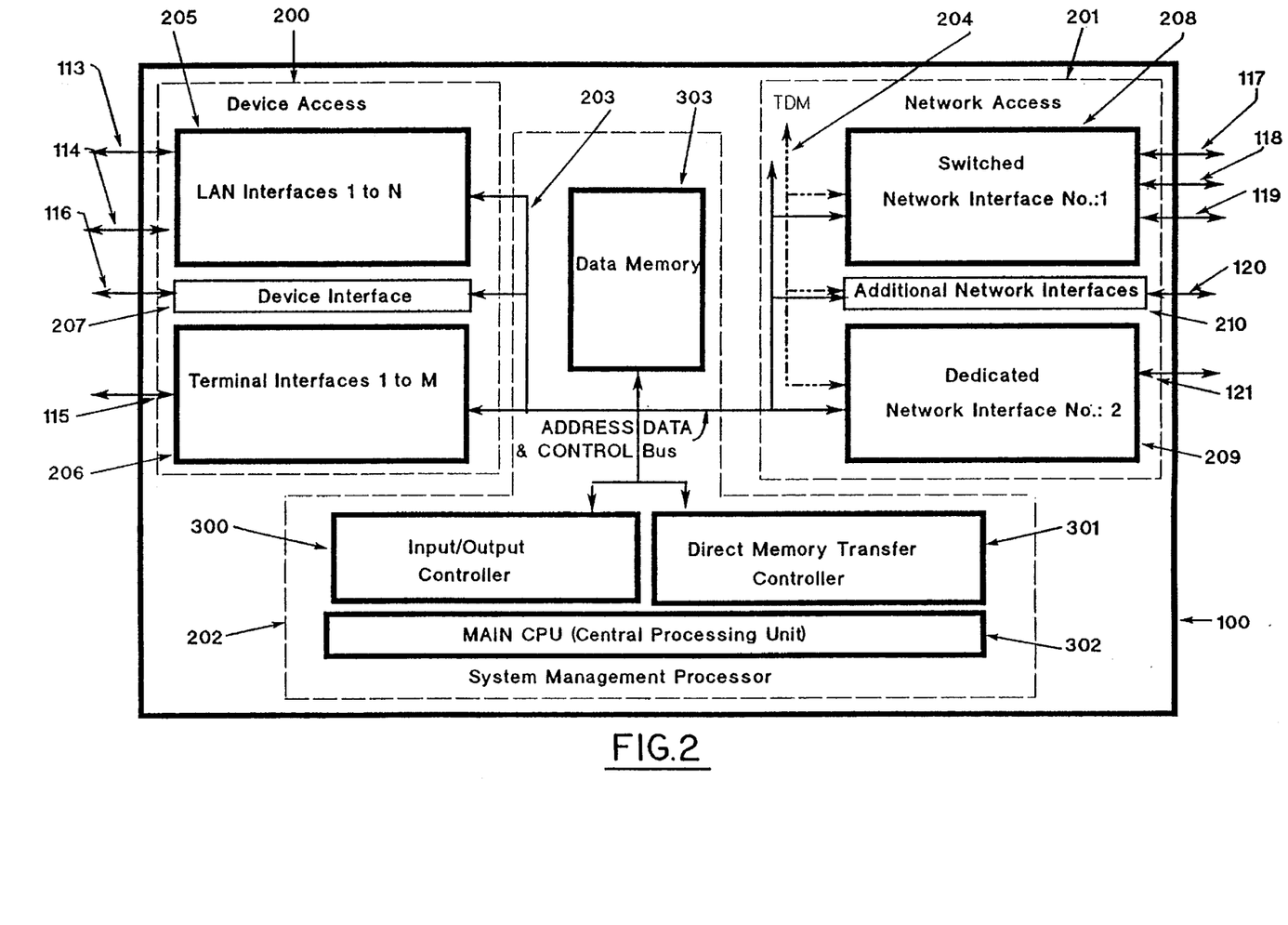
FIG. 2 is a block diagram depicting the components of the Switched Network Access System shown in FIG. 1.

FIG. 1 depicts one of the Switched Network Access Systems 100 in greater detail. The System 100 includes device access 200, network access 201, system management processor 202, address data and control bus 203 and Time Division Multiplex (TDM) highway 204.

Device access 200 provides user connectivity to Switched Network Access System 100 through any of three types of industry standard device interfaces including LAN interface 205, terminal interface 206, and device interface 207. LAN interface 205 itself may include, by way of example, conventional Ethernet or token ring interfaces. Terminal interface 206 itself may include, by way of example, RS-232 and V.35 interfaces. Device interface 207 itself may include, for example, standard synchronous and non-synchronous device interfaces.

Network access 201 includes switched network interface 208, dedicated network interface 209 and additional network interface 210. Switched network interface 208 includes interfaces which terminate Integrated Services Digital Network (ISDN) Basic Rate Interface (BRI) and/or Primary Rate Interface (PRI) lines. The ISDN interfaces, BRI and PRI, are defined by the International Telegraph and Telephone Consultative Committee (CCITT) in terms of channel structure. The Basic Rate Interface is composed of two B-Channels and one D-Channel (2B+D) per line. The Primary Rate Interface can be composed in many ways, for example, as 23B +D, 3H0+D, or as a single H1 channel per line. The B-Channel typically contains user data while the D-Channel is reserved for providing the network with routing instructions. Dedicated network interface 209 includes interfaces to terminate T1 and leased lines. Additional network interface 210 includes, by way of example, interfaces to terminate Digital Data Services (DDS) lines. Device interfaces 205-207 permit a wide variety of user devices to connect to the Switched Network Access System 100 thereby providing network access through network interfaces 208-210 to both switched and/or private networks as well as to public switched digital networks 102. All device and network interfaces just described are well known standards in the communications industry.

Figure 3:
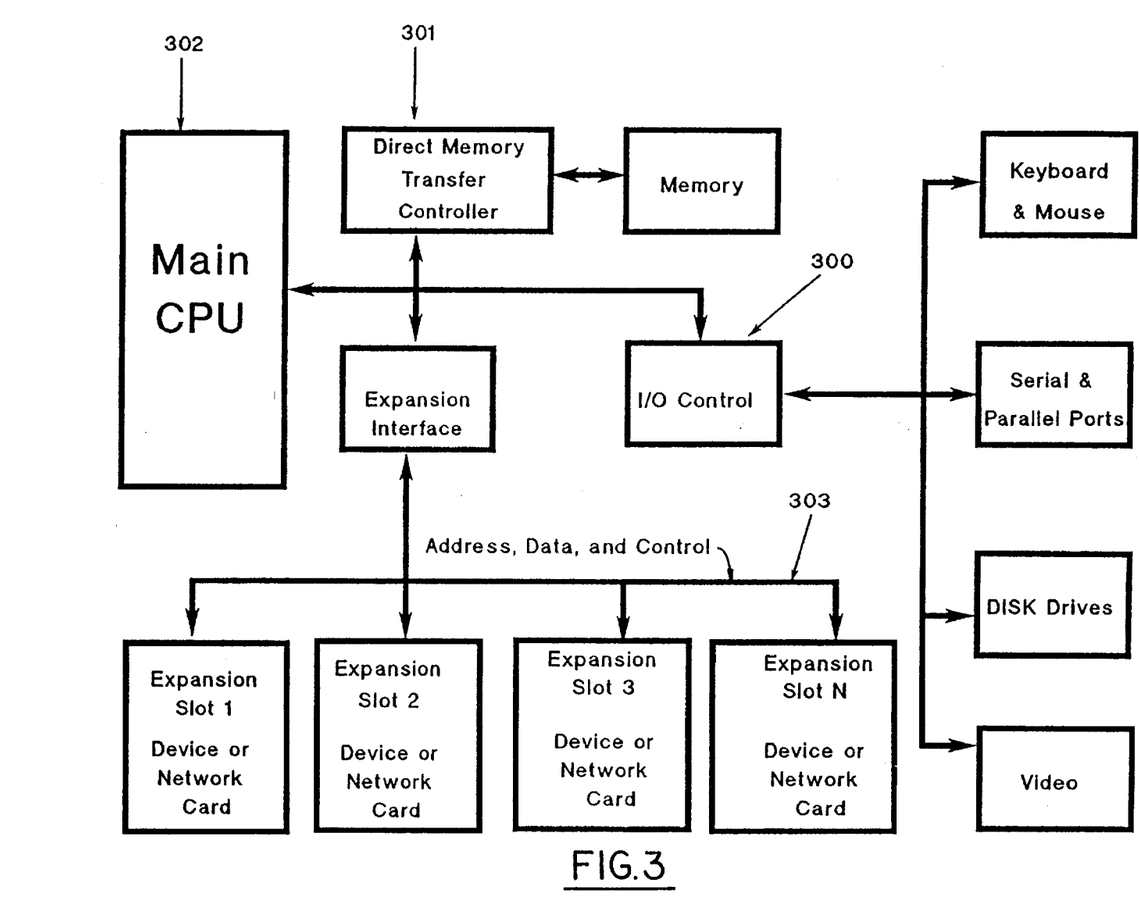
FIG. 3 is a block diagram depicting in the component parts of controller management processor shown in FIG. 2.
Figure 4:
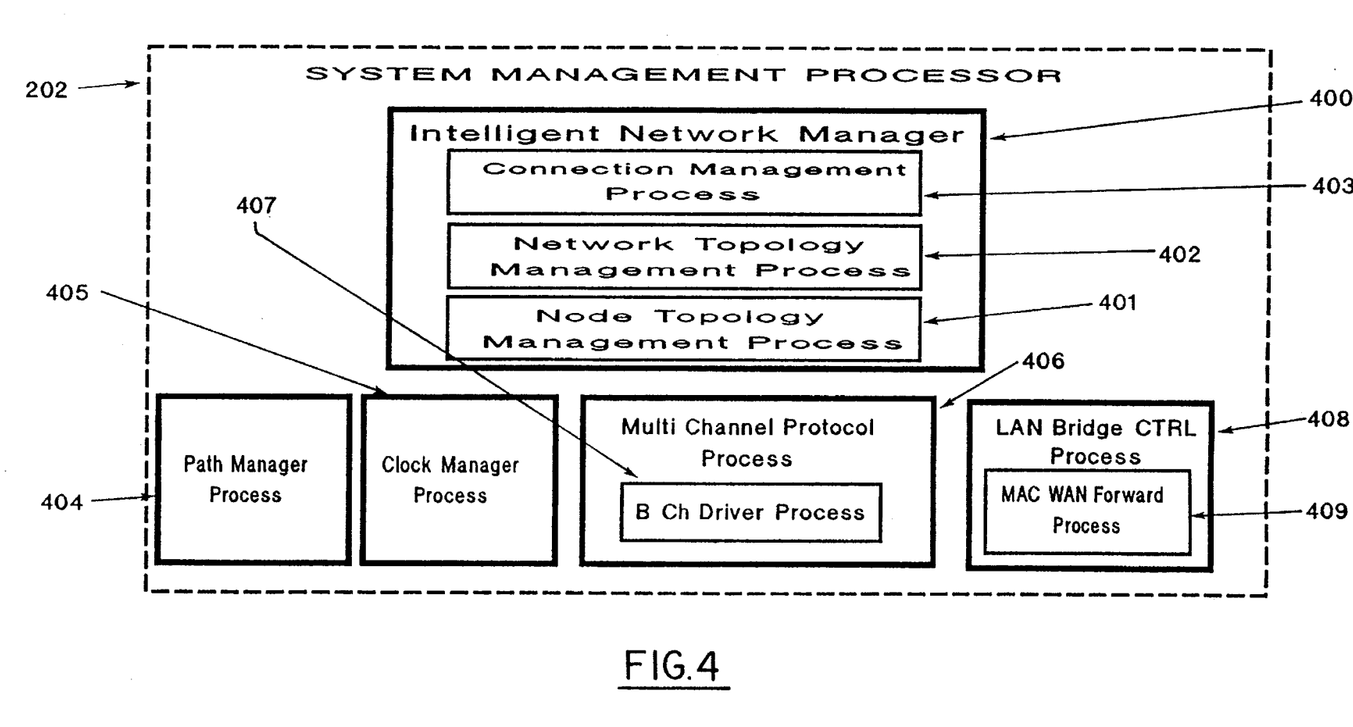
FIG. 4 is a block diagram depicting functional software entities residing on system management processor shown in FIG. 3.

System management processor 202 including input/output controller 300, direct memory transfer controller 301, main cpu central processing unit 302 and data memory 303 form a standard PC platform as depicted in FIG. 3. Functional software entities residing on system management processor 202 are depicted in FIG. 4 include intelligent network management process 400 further comprised of node topology management process 401, network topology management process 402 and connection management process 403. Additional software entities which perform system management include path management process 404, clock management process 405, multi-channel protocol process 406 further comprised of multiple B-channel driver process 407, and LAN bridge control process 408 comprised of MAC WAN forward process 409.

Figure 5:
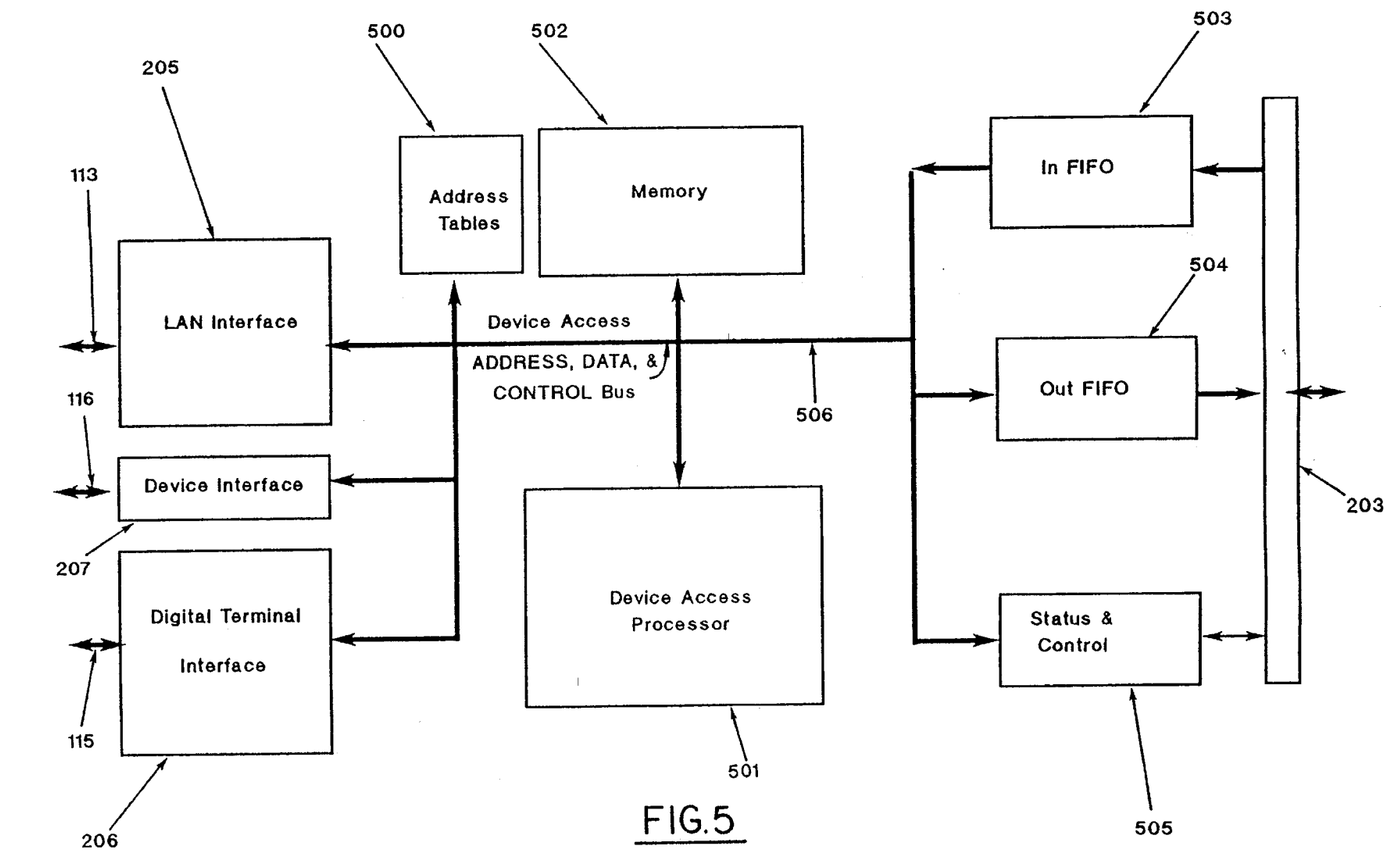
FIG. 5 is a block diagram depicting the component parts of device access shown inside in FIG. 2.

FIG. 5 depicts in further detail device access 200 including LAN interface 205, digital terminal interface 206, device interface 207, local address memory 500, device access processor 501, device access memory 502, input FIFO register 503, output FIFO register 504, status and control register 505, device access address, data and control bus 506 and address, data and control bus 203. All of these components just described are conventional items well known and readily available commercially to the public.

Figure 6:
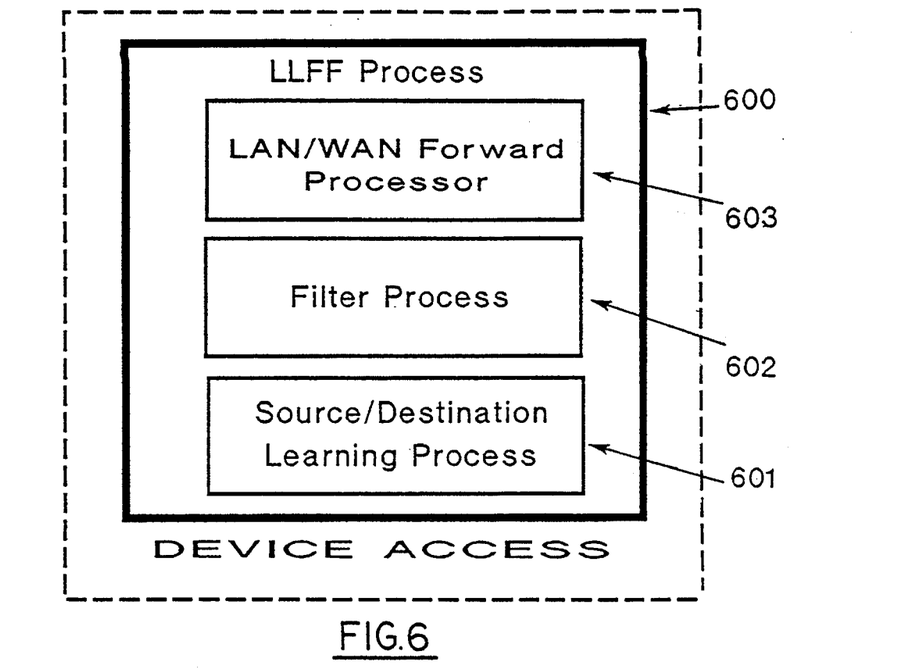
FIG. 6 is a block diagram depicting functional software entities residing on device access processor shown in FIG. 5.

FIG. 6 depicts listening, learning, filtering, forward (LLFF) process 600 entities residing on device access processor 501 including source/destination learning process 601, filter process 602 and LAN/WAN forward process 603 which preferably implement IEEE 802.1 protocol for MAC (Media Access Control) layer bridges. Device access processor 501 under control of listening, learning, filtering, forward (LLFF) process 600, specifically source/destination learning process 601, monitors source and destination addresses inside packets received through LAN access link 113. A local address table is compiled in address memory 500 from responses monitored on LAN access link 113.

After learning has taken place, device access processor 501 under control of filter process 602 checks to see if the address is contained in local address table 202. If the address is found then the address is local and the packet is discarded. Filter process 602 forwards any MAC frames with a destination address that identifies a bridge explicitly or contains a group address. However, if the address is not found in the address table, the packet is assumed to be destined for a remote location and is transported via device access address, data and control bus 506 to out FIFO 504 under LAN/WAN forward process 603. Device address information is passed to main cpu 302 which compiles the information to generate a remote address table. At the direction of main cpu 302, input/output controller 300 forwards the remotely addressed packets from out FIFO 504 to data memory 303 via address, data and control bus 203. Intelligent network management process 400 then commands direct memory transfer controller 301 to forward the remotely addressed packets to the appropriate network interface 208-210 via address, data and control bus 203.

Figure 7:
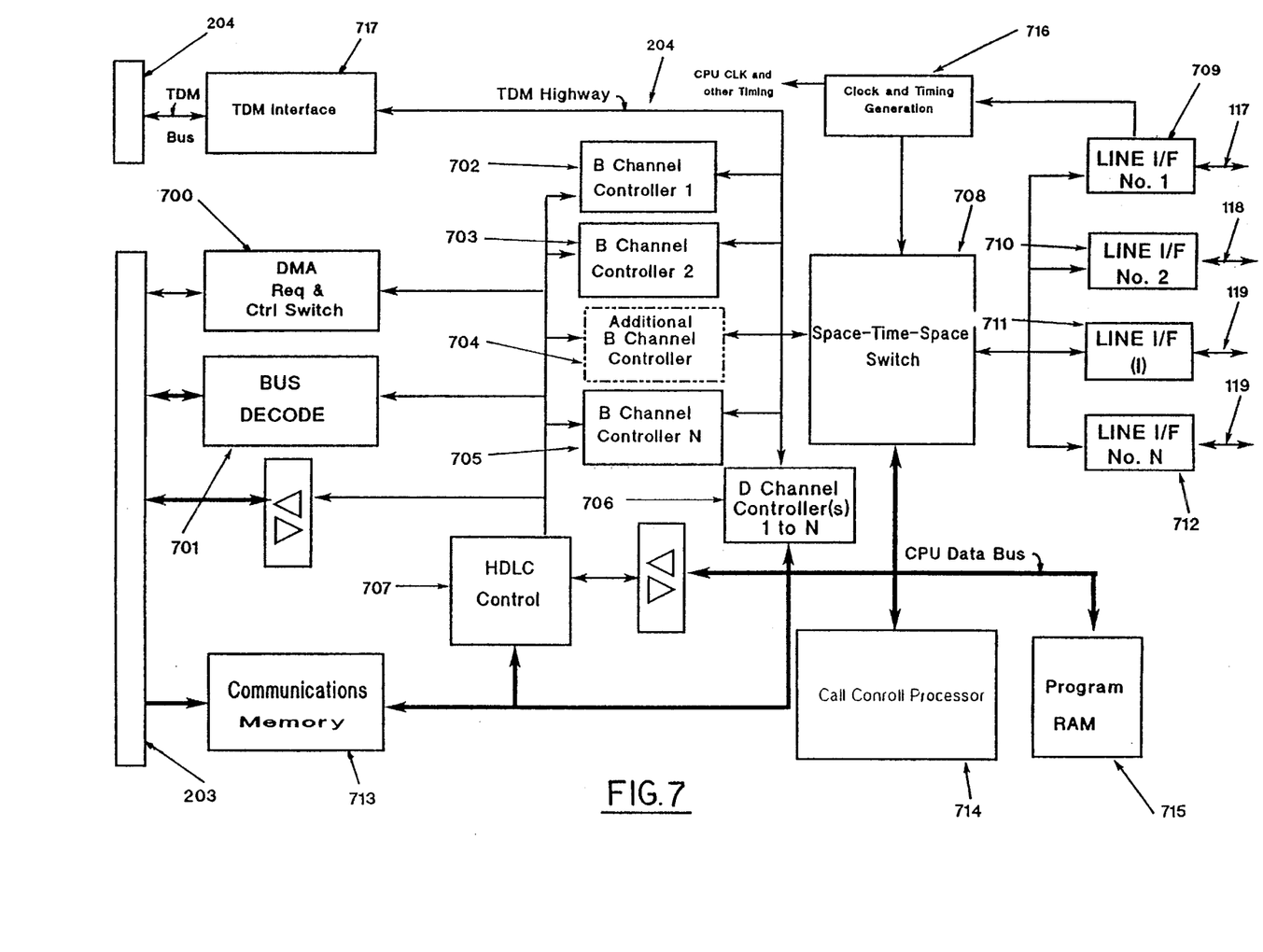
FIG. 7 is a block diagram depicting in the component parts of network access shown in FIG. 2.

FIG. 7 depicts in further detail the component parts of network access 201 shown in FIG. 1. Network access 201 includes DMA request and control switch 700, BUS decode circuit 70, B-channel controllers 702-705, D-channel controller 706, HDLC control processor 707, space-time-space switch 708, line interfaces 709-712, communications memory 713, call control processor 714, program RAM 715, clock and timing generation circuit 716, TDM interface 717. Local 80186 16 MHz call control processor 714 manages all call control and protocols for OSI layers one, two and three that enable network access 201 to communicate across standard services provided by public switched digital network 103 such as basic rate or primary rate ISDN. OSI layer one protocols specify electrical characteristics of the physical medium forming the communications facility. Layers two and layer three enable call control processor 714 to initiate, establish, maintain and terminate connections with local central office 108 switches and remote central offices 109-110 within public switched digital network 103 in accordance with System instructions received under the control of HDLC controller processor 707 via communications memory 713 from main cpu 302. These instructions may include, by way of example, direction to establish a connection between Ethernet user 104 and host server 106. To establish such a connection, a telephone number is passed to call control processor 714 which outputs the appropriate OSI layer two and three protocol signals according to OSI layer two and three protocols to central office 108 based on access stimuli received from the central office over the communication lines 117-119.

Figure 8:
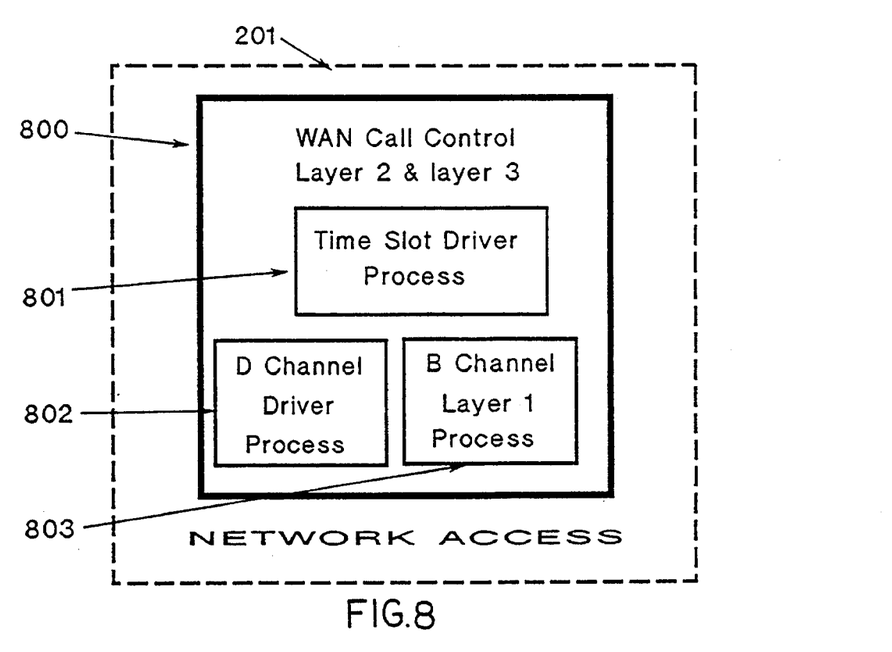
FIG. 8 is a block diagram depicting functional software entities which control the functioning of network access shown in FIG. 7.

FIG. 8 depicts software entities which control the functioning of network access 201 including WAN call control process for OSI layer two and three 800, further comprised of time slot driver process 801, D-channel driver process 802, and layer one B-channel control process 803. WAN call control process for OSI layer two and three 800 is responsible for the setup and release of switched data calls through public switched digital network 103.

To forward a remotely addressed packet to the appropriate network interface 208-210, main cpu 302 under the control of intelligent network management process 400 directs the transmission of the packet from data memory 303 over address, data and control bus 203 under the control of DMA request and control switch 700 and Bus Decode circuit 701 to B-channel controller 702, for example. The data transfer rate is accommodated to the rate of communication line 117, for example, by establishing a pointer for addresses in data memory 303 in which the packet is buffered. The pointer enables B-channel controller 702 to request information from data memory 303 which responds by sending a burst of data into FIFOs within B-channel controller 702. B-channel controller 702 then forwards the packet to space-time-space switch 708 at the appropriate communications line rate for transmission through line interface 709, for example, onto the appropriate communication line 117. Each line interface 709-712 is separately connected into the connection memory of space-time-space switch 708. All individual framing information delays are absorbed between line interfaces 709-712 and space-time-space switch 708 so that the B-channel side of time-space-time switch 708 is synchronous to a clocking signal derived from one of the lines throughout the rest of the network interface card 208.

A unique feature of System 100 results from the fact that each B-channel controllers 702-705 and D-channel controller 706 is programmed to support the protocol running on the TDM highway 204 connected to the space-time-space switch 708. Each B-channel controller 702-705 and D-channel controller 706 is therefore able to transmit data of any bit length starting in any time slot on TDM highway 204. For example, B controller 702 can be programmed to wait until time slot 12 and then send eight bits. Thus, the present invention permits a call connection established through a particular line interface 709-712 to be uniquely assigned to a B-channel time slot, 12 for example, with the result that no other connection will subsequently be assigned to time slot 12 for the duration of the call connection. In this way, contention management is controlled by software through the assignment of time slots for each call connection.

Time slot assignment is administered by path management process 404 which is part of the higher level software running on main cpu 302. High level software administration of time-slot assignments allows connection of multiple expansion B-channel controllers to switch data onto the same TDM highway 204 enables main cpu 302 to assign, accept and transfer data from any device interface on any of the expansion boards onto any time slot on any communications line. This arrangement is unique in customer premise equipment in that a non-blocking system is implemented which provides cross connection between any user device connected to the System 100 to any time slot on any communications facility 117-121 and is adaptive on a call by call basis. The above described configuration provides users 100-101 with bandwidth agility to automatically increase bandwidth based on traffic demand without manual reconfiguration. Although any B-channel controller 702-705 or D-channel controller 706 can be assigned to uniquely correspond to any line interface 709-712, at the same time, if two contiguous B-channel communications lines are provided from public switched digital network 103, both can be assigned to the same B-channel controller 702-705. Thus the flexibility of terminating either single or multiple contiguous DSO channels on any one controller is also provided through the utilization of space-time-space switch 708 and the flexibility of the time slot driver process 801 which runs on HDLC control processor 707.

Figure 9:
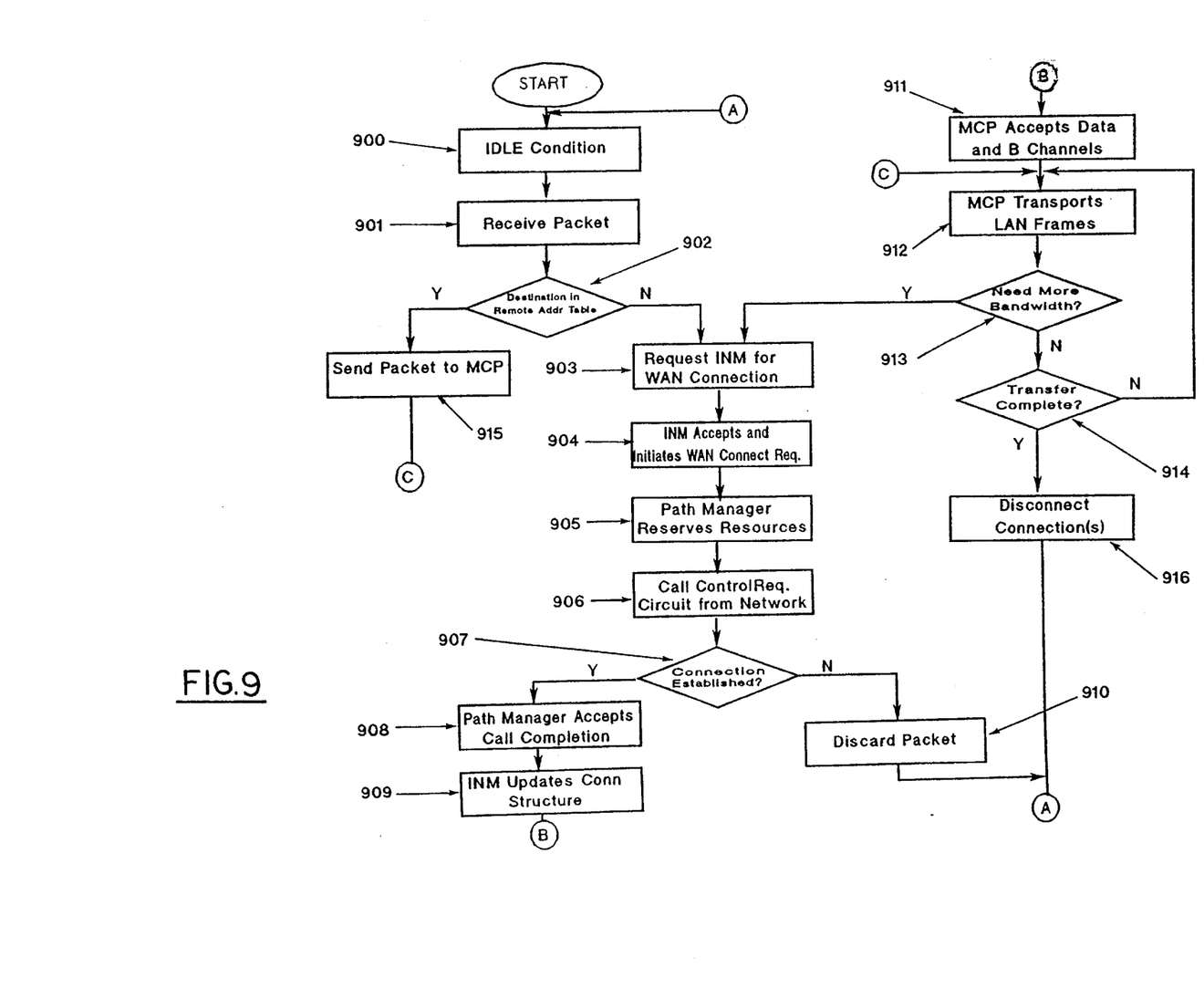
FIG. 9 is flow chart depicting method steps of the present invention.

The operation of the System as depicted in the flow diagram of FIG. 9 will now be described with reference to aspects of the preceding drawings. Assume that user 101 wishes to complete a high bandwidth data call across public switched digital network 103 to user 102. The system of the present invention begins in idle condition 900 followed by a source/destination learning phase 901 triggered upon the arrival of a packet on LAN access link 113 where device access processor 501 searches local address table 500 in Step 902 to determine whether the specified destination address is contained therein. In the event that the destination address does not exist in local address table 500, the packet is assumed to be destined for transmission over public switched digital network 103. LAN/WAN Forward process 600 begins in Step 903 as device access processor 501 signals a request to main cpu 302 via address, data and control bus 203 using status and control register 505 that a WAN connection is needed providing destination information to intelligent network management process 400 which checks remote address tables and network topology. In Step 904, main cpu 302 under the control of intelligent network management process 400 accepts this request and information initiating path management process 404 in Step 905 which reserves resources required to complete the connection internally within Switched Network Access System 100 which may include by way of example, B-channel controller 702, line interface 709 and a time slot within space-time-space switch 708.

In Step 906, main cpu 302 under the control of intelligent management process 400 signals call control processor 714 under the control of WAN call control process 800 to make a connection to the remote site. Path management process 404 passes packet destination address information which is cross references to a phone number in communications memory 713 tables to WAN call control process 800 which proceeds to perform the protocol (e.g. ISDN) signal exchanges with local central office 103-109 to establish a communications call connection over public switched digital network 103. If a connection is established in Step 907, call control processor 714 under the direction of WAN Call control process 800 informs path management process 404 that the connection had been established. In Step 908, path management process 404 accepts the call completion acknowledgement from call control processor 714 which is operating under the control of WAN call control process 800 and informs intelligent network management process 400 that a connection has been established triggering, in Step 909, main cpu 302 under the control of connection management 403, to update connection structure data on network topology, connectivity and available services in data memory 303 to include a listing of the new communications connection to that remote site across the WAN. In the event that a connection is not established in Step 907, device processor 501 discards the packet in step 910 and returns to idle condition 900 to repeat the process thus far described.

In Step 911, intelligent management process 400 directs multi-channel protocol process 406 to oversee the transfer of data utilizing the particular resources reserved by path management process 404 in Step 905. Direct memory transfer controller 301 under control of multi-channel process 406, specifically B-channel driver 407, accepts the assignment of a B-channel controller then oversees the transmission of a single packet which it distributed across one or multiple connections according to the appropriate communications line protocol. In Step 912, multi-channel protocol process 406 accepts packet data frames from LAN bridge control process 408, specifically MAC WAN forward process 409. MAC WAN forward process 409 operating in direct memory transfer controller 301 signals device access processor 501 functioning under the control of LAN/WAN forward process 602 a data memory 303 address pointer to enable DMA request and control switch 700 to transfer packet frames from LAN interface 205 via address, data and control bus 203 to the assigned B-channel controller 702, for example.

In Step 913, channel utilization is monitored by multi-channel protocol process 406 which determines if more bandwidth is required. As long as existing bandwidth meets throughput criteria requirements, multi-channel protocol continues data transfer until the entire packet message has been transmitted. Upon the completion of data transfer in Step 914, call control processor 714 under the control of WAN call control process for OSI layer two and three 800 terminates the connection at the direction of intelligent network management process 400. Direct memory transfer controller 301 under the control of multi-channel protocol process 406 signals to intelligent management process 400 in main cpu 302 which decides whether to disconnect the communications connection. In Step 913 however, if a determination is made that more bandwidth is required, multi-channel protocol process 406 returns to Step 903 by signalling a request to intelligent network process 400 on main cpu 302 that another WAN connection through public switched digital network 103 is needed to the same destination.

In the alternative, after a determination has been made in step 913 that more bandwidth is not required, a test is made in step 914 to determine whether transfer of all packets addressed to the specified remote destination has been completed. While transfer is not complete in step 914, the method branches back to step 912 wherein direct memory transfer controller 301 continues to transfer LAN packet data frames. This transfer loop is also followed in, Step 915, in the event that the packet destination address exists in remote address table compiled by network topology management process 402. Once multi-channel protocol process 406 determines that data transfer is complete, disconnection occurs in step 916 and the method return to idle condition 900 and System 100 returns to idle condition 900.

Figure 10A:
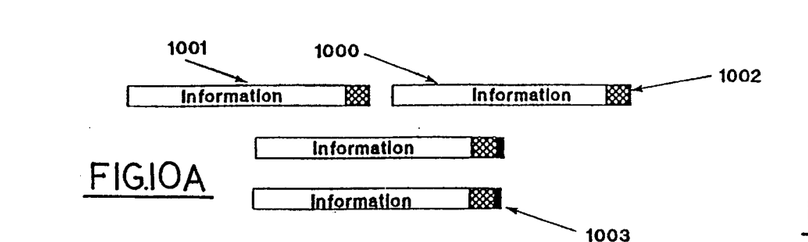
FIGS 10A–10E are diagrammatic representations depicting appendage by multi-channel protocol of header information to the standard packet format for inverse multiplexing and sub-packet inverse multiplexing.
Figure 10B:
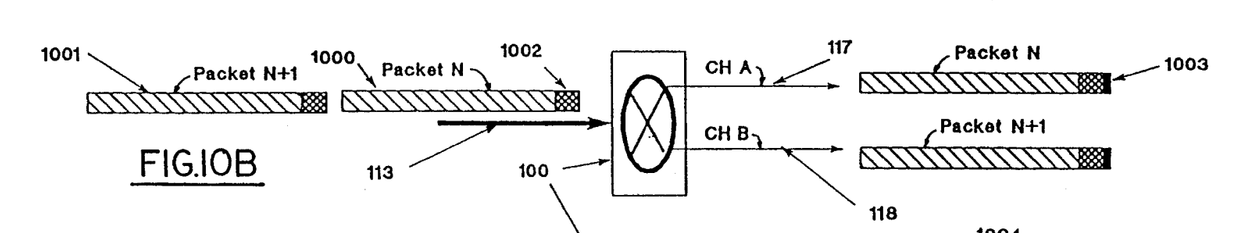

FIG. 10A depicts packets 1000 and 1001 which are part of a high bandwidth stream of data packets of LAPB or LAPD format with layer 2 header information already contained therein. B-channel controllers 702-705, under the control of multi-channel protocol process 406, append MCP header 1003 including packet sequencing and destination routing information to individual packets 1000 and 1001 to facilitate inverse multiplexing of the information stream by local Switched Network Access System 100 and to permit re-assembly of the stream of high bandwidth data packets by the remote Switched Network Access System at the receiving end. FIG. 10B depicts a high bandwidth stream of data packets received on LAN access link 113 into switched network controller 100 which inverse multiplexes the packets onto communications lines 117 and 118 by breaking apart the data packet stream and transmitting data packets 1000 and 1001 over different communications channels to the same destination site. If a packet fragment is received at the far end, direct memory transfer controller 301 re-transmits the packet. If multiple packets arrive out of sequence, direct memory transfer controller 301 re-sequences them before sending them out onto the remote LAN.

Figure 10C:
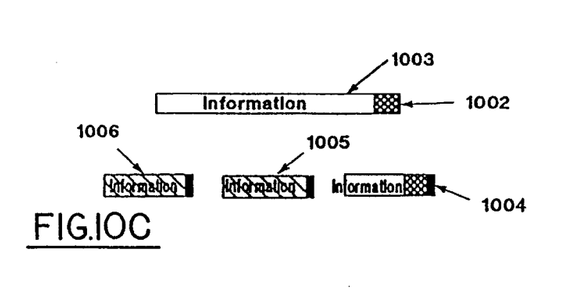

FIG. 10C depicts packet 1000 of LAPB or LAPD format. B-channel controllers 702-705 under the control of multi-channel protocol process 406, segment packet 1000 into sub-packets 1004, 1005 and 1006 appending MCP header 1003 including sub-packet sequencing and destination routing information to each sub-packet. Inverse multiplexing of the type performed on the packet level in FIG. 10B is depicted on the sub-packet level in FIG. 10D over, by way of example, three communications channels 117, 118 and 119. Performing sub-packet inverse multiplexing improves terminal response time by decreasing transmission delay of the entire packet by ⅓ of the original transmission time in the present example.

Figure 10D:
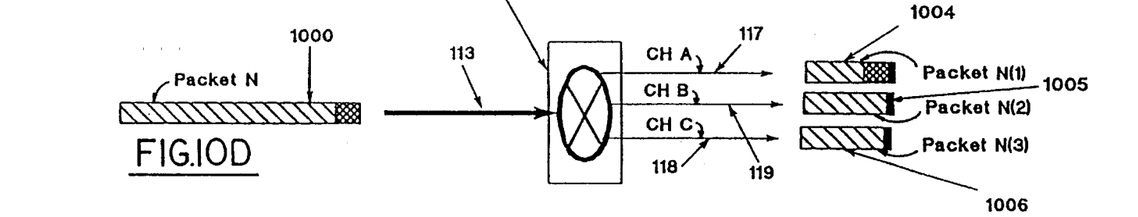
Figure 10E:
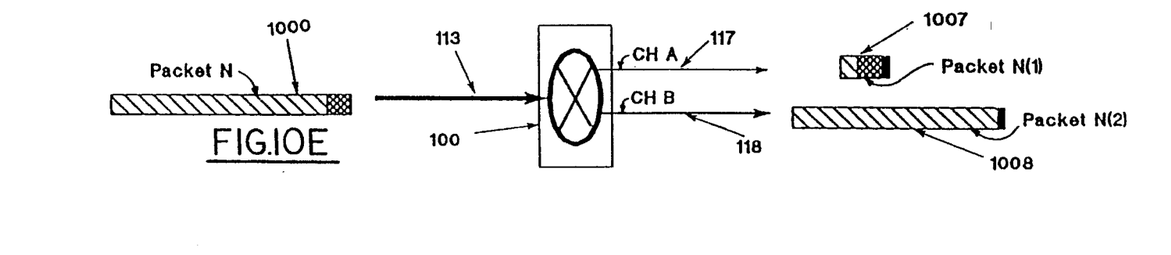

FIG. 10E depicts sub-packet inverse multiplexing of the type performed on the packet level in FIG. 10D over, by way of example, three communications channels 117 and 118 of unequal bandwidth. B-channel controllers 702-705, under the control of multi-channel protocol process 406, append MCP header 1003 to sub-packets 1007 and 1008 which are proportioned to the ratio between the unequal bandwidths of communications channels 117 and 118. Like sub-packet inverse multiplexing of equal bandwidth channels, sub-packet inverse multiplexing of sub-packets through communication channels of unequal bandwidth improves terminal response time by decreasing transmission delay of the entire packet of the original transmission time and allows intelligent network management process 400 to make efficient utilization of all time slots on all channels of the communication connections. Each Switched Network System 100, uses a scheme of inverse multiplexing, wherein line interfaces 709-712 are operative to receive data packets and sub-packets having a MCP header.

B-channel controllers 702-705, under the control of intelligent network management process 400, implement the scheme of packet and sub-packet inverse multiplexing through their ability to assign and switch data onto any time slot on the TDM highway 204 yielding a customer premise based non-blocking switching system, traditionally a central office capability. To accomplish the three types of inverse multiplexing schemes B-channel controller 702-705 perform switching functions at the direction of direct memory transfer controller 301 which is under the control of multi-channel protocol 400.

What is claimed is:

1. A method for transmitting high bandwidth messages between remote communication stations connected by a switched digital network, comprising the steps of:
  A. establishing, at a sending communication station, a plurality of communication connections through said switched digital network to a receiving communications station wherein the bandwidth of a first one of said plurality of communication connections is smaller than the bandwidth of a second one of said plurality of communication connections;
  B. forming each of said messages into one or more packets of digital data;
  C. dividing each of said packets into a plurality of sub-packets;
  D. transmitting from said sending communications station said plurality of sub-packets through said plurality of communication connections to said receiving communication station, including transmitting a first one of said sub-packets through said first communication connection, selectively transmitting a second one of said sub-packets through said second communication connection, and transmitting the remaining ones of said sub-packets through preselected ones of said communication connections;
  E. receiving said plurality of sub-packets at said receiving station;
  F. reassembling each of said plurality of sub-packets into packets at said receiving station,
  G. deleting said plurality of communication connections.

2. The method of claim 1 wherein steps (B) and (C) are performed at said sending communication station.

3. The method of claim 1 wherein step (A) includes the steps of:
  H. monitoring the capacity of said communication connection to transmit said packets, and
  I. establishing additional ones of said communication connection when the monitored capacity falls below a preselected value.

4. The method of claim 3, including the step of deleting at least certain of the communication connections in step (A) when the monitored capacity exceeds a preselected value.

5. The method of claim 1, including the step of appending routing information to each of said packets.

6. A method of transmitting digital data information in the form of data packets having a preselected sequence representing a message using a switched digital network including a plurality of communication lines from a calling user terminal to a receiving user terminal, wherein each of the lines includes one or more channels through which the data packets may be transmitted, comprising the steps of:
  (A) establishing one or more communication connections from said calling user terminal to said receiving user terminal by selecting one or more of said communication lines;
  (B) monitoring the bandwidth utilization of each of said channels through which a communication connection has been established in step (A);
  (C) establishing additional communication connections from said calling user terminal to said receiving user terminal when said utilization of the channels monitored in step (B) exceeds a first predetermined value to thereby increase the bandwidth available for transmitting the data packets;

(D) disconnecting at least certain of said communication connections established in steps (A) and (C) when said utilization of the channels monitored in step (B) falls below a second predetermined value; and (E) transmitting said data packets over the channels through said communication connections established between the calling user terminal and the receiving user terminal.

7. The method of claim 6 wherein step (E) is performed through a plurality of communication connections.

8. The method of claim 7, further including the step of:

appending to each of said data packets sequencing and routing information including identification of the receiving user terminal.

9. The method of claim 8, further including the steps of:

receiving at said receiving user terminal the packets transmitted in step (E); and sequencing said received packets in accordance with said sequencing and routing information to form the message.

10. The method of claim 8, further including the steps of:

dividing each of the data packets into a plurality of sub-packets for transmission from said calling user terminal to said receiving user terminal; and appending to each of said sub-packets said sequence and routing information.

11. The method of claim 10, wherein step (E) is performed by the substeps of:

transmitting a first one of said plurality of sub-packets on a first one of said plurality of communication connections; and transmitting a second one of said plurality of sub-packets on a second one of said plurality of communication connections and transmitting the remaining ones of said sub-packets through said communication connections.

12. The method of claim 11, further including the steps of:

receiving at said receiving user terminal said plurality of sub-packets; and sequencing said sub-packets in accordance with said sequence and routing information to form each of said data packets.

13. The method of claim 12, further including the step of:

sequencing the data packets formed by said received sub-packet sequencing step to form the message.

14. The method of claim 7, wherein a first one of said plurality of communication connections is over a first one of said plurality of communication lines, and a second one of said plurality of communication connections is over a second one of said plurality of communication lines.

15. The method of claim 8, further including the steps of:

assigning said data packets to certain time slots on a time division multiplex highway; and switching said data packets from said time division multiplex highway into available channels on said plurality of communications connections to thereby optimize bandwidth utilization of said communication connections.

16. The method of claim 11, wherein said first one of said communication connections is over a first one of said plurality of communication lines, and said second one of said communication connections is over a second one of said plurality of communication lines.

17. The method of claim 12, further including the steps of:

assigning said sub-packets to certain time slots on a time division multiplex highway; and switching said sub-packets from said time division multiplex highway into available channels on said plurality of communications connections to thereby optimize bandwidth utilization of said communication connections.

18. A method of conveying digital data information in the form of data packets having a preselected sequence representing a message from a calling user terminal to a receiving user terminal connected by a switched digital network including a plurality of communication lines, wherein each of the lines includes one or more channels through which the data packets may be transmitted, comprising the steps of:

(A) establishing a first communication connection from said calling user terminal to said receiving user terminal through a first one of said communications lines by selecting a first available channel on said first communication line;

(B) searching for a second available channel on said first communication line;

(C) establishing a second communication connection from said calling user terminal to said receiving user terminal through said first communication line when a second available channel is found in step (B);

(D) establishing a second communication connection from said calling user terminal to said receiving user terminal through a second one of said communication lines when a second available channel is not found in step (B);

(E) dividing each of said data packets into a plurality of sub-packets;

(F) appending sequencing and routing information including identification of said receiving user terminal to each one of said sub-packets;

(G) transmitting a first one of said plurality of sub-packets through said first communication connection;

(H) transmitting a second one of said plurality of sub-packets through said second communication connection, and transmitting the remaining ones of said plurality of sub-packets through said plurality of lines;

(I) receiving said plurality of sub-packets at the receiving user terminal through said first and second communication connections; and (J) reassembling said received sub-packets into the data packets in accordance with said sequencing and routing information at said receiving user terminal to form the message.

19. The method of claim 18, further including the steps of:

monitoring the bandwidth utilization of each of the channels through which a communication connection has been established in steps (A), (C), and (D); and establishing additional communication connections from said calling user terminal to said receiving user terminal when said utilization of the channels monitored in said monitoring step exceeds a first predetermined value to thereby increase the bandwidth available for transmitting the data packets.

20. The method of claim 19, further including the step of:

disconnecting at least certain of said communication connections established in steps (A), (C), and (D) when said utilization of the channels monitored in said monitoring step falls below a second predetermined value.

21. The method of claim 20, further including the steps of:

determining the bandwidth of each of said channels through which a communication connection has been established between the calling user terminal and the receiving user terminal; and segmenting each of said data packets into a plurality of sub-packets the size of said sub-packets corresponding to the size of the bandwidth of each of the channels determined by said bandwidth determining step.

22. The method of claim 21, further including the steps of:

assigning said sub-packets to certain time slots on a time division multiplex highway; and switching said sub-packets from said time division multiplex highway into said channels through which a communication connection has been established from the calling user terminal to the receiving user terminal to optimize bandwidth utilization of said communication connections.

23. The method of claim 21, wherein a first one of said plurality of sub-packets has a first size, a second one of said plurality of sub-packets has a second size, said first size being larger than said second size.

24. An apparatus for conveying data messages in the form of packets having a preselected sequence representing a message from a calling user terminal to a receiving user terminal using a switched digital network of the type including a plurality of communication lines, wherein each of the lines includes one or more channels through which the data packets may be conveyed, comprising:

means for controlling the conveyance of said packets, said controlling means including a central processor;

means coupled with said controlling means for accepting said packets from a calling user terminal, said accepting means including a device access processor;

means responsive to said controlling means for selecting one or more communication lines for establishing a plurality of communication connections from said calling user terminal to said receiving user terminal and for disconnecting at least certain of said communication connections, said selecting means including a call control processor;

means coupled with said controlling means for monitoring the bandwidth utilization of each of said channels through which said plurality of communication connections have been established, said selecting means establishing additional communication connections from said calling user terminal to said receiving user terminal responsively when said utilization of the channels monitored exceeds a first predetermined value and disconnecting at least certain of said communication connections when said utilization of the channels monitored falls below a second predetermined value, said monitoring means including said central processor coupled with a multi-channel protocol unit; and means coupled with said controlling means for transmitting said packets over the channels through which said plurality of communication connections have been established, said controlling means being operative to forward said data packets accepted by said accepting means to said transmitting means, said transmitting means including at least one line interface unit.

25. The apparatus of claim 24, further comprising:

means responsive to said controlling means for appending a first header, at said calling user terminal, to each of the data packets, said first header comprising sequencing and routing information, including identification of the receiving user terminal, said appending means including a data link controller;

said transmitting means being coupled with appending means, said transmitting means transmits a first one of said data packets over a first one of said channels through which said plurality of communication connections have been established by said selecting means, and transmits a second one of said data packets over a second one of said channels through which said plurality of communication connections have been established by said selecting means;

said transmitting means being operative to receive data packets having a second header originating from said receiving user terminal through the communication lines; and means coupled with said controlling means and coupled with said transmitting means for arranging the data packets received by said transmitting means in accordance with said sequencing and routing information contained in said second header, said arranging means including a direct memory controller.

26. The apparatus of claim 24, further comprising:

means coupled with said controlling means for dividing each of said data packets into a first plurality of sub-packets, said dividing means including a data link controller;

means responsive to said controlling means for appending a first header, at said calling user terminal, to said first plurality of sub-packets, said first header comprising sequencing and routing information, including identification of the receiving user terminal, said appending means including said data link controller responsive to said multi-channel protocol unit;

said transmitting means being coupled with said appending means, said transmitting means transmits a first one of said first plurality of sub-packets over a first one of said channels through which said communication connections has been established, and transmits a second one of said first plurality of sub-packets over a second one of said channels through which said communication connections have been established, and transmits the remaining ones of said first plurality of sub-packets over said channels through which said communication connections have been established;

said transmitting means being operative to receive a second plurality of sub-packets originating at said receiving user terminal, each one of said sub-packets having a second header, through the communication lines; and means coupled with said controlling means and said transmitting means for arranging said second plurality of sub-packets in accordance with said sequencing and routing information contained in said second header, to form a data packet in which the sequence of data bits is the same as that of the data packet originating at the receiving user terminal from which said second plurality of sub-packets was originally derived.

27. The apparatus of claim 26, wherein said dividing means includes:

means for determining the bandwidth of each of said channels through which said plurality of communication connections has been established; and means coupled with said bandwidth determining means for segmenting each of said data packets into a first plurality of sub-packets the size of said sub-packets corresponding to the bandwidth of each of the channels determined by said bandwidth determining means.

28. The apparatus of claim 27, further including:

means coupled with said controlling means for assigning said first plurality of sub-packets to certain time slots on a time division multiplex highway, said assigning means including said central processor responsive to said a path management unit, and further including said data link controller; and means coupled with said controlling means and said transmitting means for switching said first plurality of sub-packets from said time division multiplex highway into the channels through which said plurality of communication connections has been established by said selecting means, said switching means including a switch.

29. The apparatus of claim 27 wherein a first one of said plurality of sub-packets has a first size, a second one of said plurality of sub-packets has a second size, said first size heine larger than said second size.

30. An apparatus for use in conveying data messages in the form of packets from a calling user terminal to a receiving user terminal using a switched digital network having a plurality of communication lines, wherein each of the lines includes one or more channels through which the packets may be conveyed, comprising:

a system management processor including means for controlling multi-channel communications;

device access means coupled with said system management processor and with said calling user terminal for accepting packets;

network access means coupled with said system management processor and said plurality of communication lines for transmitting said packets from said calling user terminal and receiving packets transmitted from said receiving user terminal, said system management processor being operative to forward said packets from said device access means to said network access means, said network access means including a call control processor responsive to said system management processor for establishing on available channels a plurality of communication connections between said calling user terminal and said receiving user terminal and for disconnecting at least certain of said plurality of communication connections, said network access means further including a controller, coupled to said system management processor for receiving said packets originating at said calling user terminal, said controller including a means, responsive to said means for controlling multi-channel communications, for segmenting each of said packets into a plurality of sub-packets, said controller including a means, responsive to said means for controlling multi-channel communications and connected to said segmenting means, for appending a header to each one of said plurality of sub-packets, said header containing sequencing and routing information, said controller being operative to transmit a first one of said plurality of sub-packets having said header through a first one of said communication connections and a second one of said plurality of sub-packets through a second one of said communication connections and the remaining ones of said plurality of sub-packets through said communication connections, said system management processor signals call control processor to establish said first and second ones of said communication connections on a first one of said communication lines when channels are available on said first one of said communication lines.

31. The apparatus of claim 30 wherein said means for controlling multi-channel communications monitors the bandwidth utilization of each of the channels through which a communication connection has been established by said call control processor, said means for controlling multi-channel communications signals said call control processor via said system management processor to establish a further communication connection between the calling user terminal and the receiving user terminal when said utilization of the channels monitored exceeds a first predetermined value, said means for controlling multi-channel communications signals said call control processor via said system management processor to disconnect at least certain of said communication connections when said utilization of the channels monitored falls below a second predetermined value, said system management processor, being responsive to said means for multi-channel communications, changes the number of communication connections in response to bandwidth utilization.

32. The apparatus of claim 31, wherein said network access means further includes:

a time-division multiplex highway having a plurality of time slots, said highway coupled to said controller, wherein said controller transmits the packets onto selected time slots of said highway;

a switch for routing selectively the packets, said switch being coupled to said highway; and a line interface for interfacing said switch to the communication lines of the switched digital network, said line interface being connected to said switch, wherein said packets on said selected time slots of said highway are routed by said switch to any selected channel of the communication lines.

33. The apparatus of claim 32, wherein said means for multi-channel communications includes a central processing unit.

34. The apparatus of claim 33, wherein said means for segmenting includes:

means for determining the bandwidth of each of the channels through which said plurality of communication connections have been established; and means coupled with said bandwidth determining means for dividing each of said data packets into a first plurality of sub-packets the size of said sub-packets corresponding to the bandwidth of each of the channels determined by said bandwidth determining means.

35. The apparatus of claim 34, wherein a first one of said plurality of sub-packets has a first size, a second one of said plurality of said sub-packets has a second size, said first size being larger than said second size.

* * * * *

UNITED STATES PATENT AND TRADEMARK OFFICE
CERTIFICATE OF CORRECTION

PATENT NO. : 5,459,720
DATED : October 17, 1995
INVENTOR(S) : Iliev, et al.

It is certified that error appears in the above-indentified patent and that said Letters Patent is hereby corrected as shown below:

Column 15, line 16, "heine" should be --being--

Signed and Sealed this

Thirtieth Day of January, 1996

Attest:

BRUCE LEHMAN

Attesting Officer

Commissioner of Patents and Trademarks